United States Patent [19]  [11]  4,280,961
Schneider et al.  [45]  Jul. 28, 1981

[54] METHOD OF RECOVERING AND/OR REFINING ANIMAL FATS

[75] Inventors: Fred Schneider, Gümligen; Wolfgang Sirtl, Zurich, both of Switzerland

[73] Assignee: Ernst Haussener, Berne, Switzerland

[21] Appl. No.: 117,227

[22] Filed: Jan. 31, 1980

[30] Foreign Application Priority Data

Feb. 1, 1979 [CH] Switzerland .......................... 1000/79

[51] Int. Cl.$^3$ ................................................ C11B 1/10
[52] U.S. Cl. ............................... 260/412.8; 260/428.5; 260/412.6
[58] Field of Search ............... 260/412.6, 412.8, 412.4, 260/428.5

[56] References Cited

U.S. PATENT DOCUMENTS 2,118,454  5/1938  Schaafsma ......................... 260/412.6
2,166,160  7/1939  King .................................... 260/412.6
3,923,847  12/1975  Roselins et al. .................... 260/412.4

FOREIGN PATENT DOCUMENTS 565238  8/1975  Switzerland .
1058076  2/1967  United Kingdom .

Primary Examiner—John F. Niebling
Attorney, Agent, or Firm—Oblon, Fisher, Spivak, McClelland & Maier

[57] ABSTRACT

Fatty animal starting material is subjected to extraction using a gas at supercritical conditions. The extraction operation takes place in a static column without circulation. The gas used as a solvent in the extraction operation may be subsequently regenerated and re-used. Any innocuous gas may be used provided its critical constants fall within the pressure and temperature ranges dictated by the extraction material. The fats are completely extracted without chemical modification of either the extract or the residue, both of which retain their natural composition. The water content of the extracted fats is less than 0.2% by weight. Scrap fat from meat and offal, such as visceral fat, may be used as starting material.

9 Claims, 1 Drawing Figure

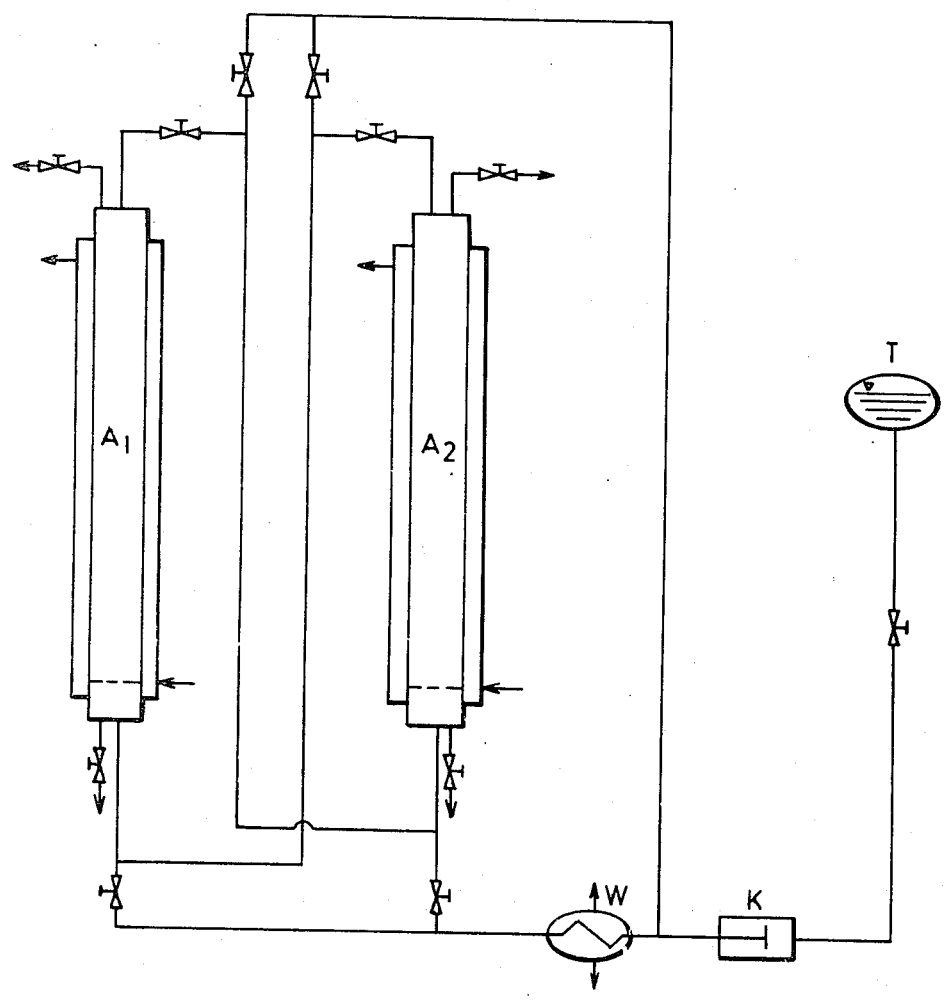

METHOD OF RECOVERING AND/OR REFINING ANIMAL FATS

This invention relates to a method of recovering and/or refining animal fats by extraction using a gas at supercritical conditions and to the application of the method in recovering fat from offal and other by-products of the meat-processing industry.

Gases at supercritical conditions are known to constitute solvents for fats and oils. A method of recovering vegetable fats and oils is described in Swiss Pat. No. 565,238, carbon dioxide in its supercritical state being utilized as an extractant in closed-circulation extraction. Gases which are unobjectionable chemically and as to taste, which are not prejudicial to health, and which yield no chemical residue may be utilized as extracting agents. The advantage of such extraction methods is that, depending upon the choice of the extractants, they can normally be carried out at lower temperatures than the conventionally used industrial processes such as solvent extraction, decoction, wet rendering, or dry rendering. Thus, extract and extraction residue are spared lengthy heat-treatments, which generally leads to better quality of the products and allows a saving on energy. Furthermore, the products are free of chemical residues and therefore non-injurious to health and unchanged in taste.

The drawbacks of the methods described are relatively long extraction cycles, in which either the circulating extractant must be expanded and subsequently recompressed for purposes of separating the extract, or else this separation must be brought about by temperature change, i.e., cooling and reheating.

U.S. Pat. No. 2,118,454 discloses a method of extracting and fractionating high molecular fats with the aid of low molecular compounds. In this method, extraction or fractionation takes place in the paracritical range, i.e., at a temperature close to the critical point of the solvent, but solely in the liquid phase. In order fully to exploit the dissolving capacity, this disclosure proposes the use of an additional solvent as well as mechanical stirring and countercurrent treatment. There is nothing to suggest to those skilled in the art that extraction and fractionating might be carried out in the supercritical range in a fluid phase. On the contrary, the proposals that the dissolving capacity be increased by using an added solvent, mechanical stirring, and countercurrent flow tend rather to lead away from the possibility of utilizing supercritical conditions and perhaps even to create a prejudice against such a possibility.

However, upon transition to the supercritical state, the dissolving capacity changes drastically and is considerably greater in the fluid phase, so that the additional measures proposed in the prior disclosure may be completely dispensed with. The equipment requirements are greatly simplified. In the fluid phase, fractionation can be controlled merely by varying the pressure and temperature parameters.

The term "fluid phase" as used herein relates to the gas at supercritical conditions.

It is an object of this invention to provide an improved method of extracting and/or refining animal fats which does not exhibit the aforementioned drawbacks and can be carried out simply and economically, within a relatively short period of time, by means of relatively simple apparatus.

A further object of this invention is to provide such a method which is applicable in recovering fats and oils from offal and other by-products of the meat-processing industry.

To this end, in the method according to the present invention, the improvement comprises the step of carrying out the extraction operation in a static column without circulation.

Particularly suitable and preferred gases to be used as solvents in the extraction operation are carbon dioxide, nitrous oxide, and possibly halogenated hydrocarbons such as ethane, ethylene, and fluorinated hydrocarbons. However, other gases which are unobjectionable from the chemical and health point of view may also be used insofar as their critical constants, as known from the literature, fall within the pressure and temperature ranges dictated by the extraction material.

The present method makes it possible to extract animal fats from animal starting material while fully retaining the natural composition of the fat, neither the extracted fat nor the extraction residue being chemically modified.

The present method further makes it possible to remove more than 95% by weight of the extractable fat content from animal products, and the parameters can be selected in such a way that virtually anhydrous fat is obtained.

It is the combination of the parameters of pressure (p) and temperature (t) which is decisive for the dissolving and separation characteristics. The solubility of a low-volatility substance can increase so greatly in a fluid gas that the concentration of the dissolved components is far above what would be expected on the basis of the vapor pressure. Thus, by varying these parameters, it becomes possible to control the passage of the water constituent from the extract into the residue, or vice versa, from the residue into the extract. In any case, however, it is expedient to adhere to the parameters $p < p_{crit.}$ and $t < t_{crit.}$.

A preferred embodiment of the invention will now be described in detail with reference to the accompanying drawing, which is a diagram of apparatus suitable for carrying out the method according to the invention.

In the apparatus shown in the drawing, a vessel $A_1$ in the form of an autoclave is filled with coarsely chopped scrap fat. This starting material need not be of any particular shape, and the vessel may be densely packed. Atmospheric oxygen is removed from the vessel by flushing with carbon dioxide. Vessel $A_1$ is then sealed, charged with carbon dioxide at supercritical conditions, and allowed to stand for the duration of the extraction operation.

While extraction is taking place in vessel $A_1$, an analogous vessel $A_2$, also in the form of an autoclave, is filled with starting material and rid of atmospheric oxygen in the same manner.

When extraction in vessel $A_1$ has terminated, the carbon dioxide at supercritical conditions is transferred from vessel $A_1$ to vessel $A_2$, and the pressure is totally let down within vessel $A_1$.

Supercritical conditions are then built up again in vessel $A_2$, and the operation proceeds in the same manner as for vessel $A_1$, thus making it possible to carry out the method alternatingly under economical operating conditions.

The duration of extraction varies as a function of the particular starting material and is generally within the range of 10–60 min.

Vessels $A_1$ and $A_2$, in the form of autoclaves, are equipped with heating jackets and fine-pored metal filter plates. During the extraction operation, the extracted animal fat collects at the bottom of the columnar autoclave, while the residues accumulate at the top. The extracted fat may be separated from the extraction residue either mechanically, after ejection of the entire contents of the column, or by melting by means of the heating jacket and withdrawal of the extracted fat fraction at the bottom of the autoclave.

In the apparatus illustrated, carbon dioxide is supplied from a storage tank T and brought to supercritical conditions via a compressor K and a heat exchanger W. Heat of compression taken off in heat exchanger W can be utilized directly in the heating jacket, thus offering an economical operating possibility as regards energy requirements.

The gas used as a solvent for the extraction operation can thereafter be regenerated and re-used, which is a further advantage of the method from the point of view of economy.

EXAMPLE 1

In accordance with the procedure described above, vessels $A_1$ and $A_2$ of the apparatus illustrated were each filled with 800 g. of suet salvaged from slaughter waste. The suet was pressed out with dry carbon dioxide at a pressure of 320 bars and a temperature of 45° C. for 60 min. The contents of each autoclave were then ejected in the form of a solid stick. The extracted fat constituent had collected at the bottom of each column and was sharply divided from the extraction residue at the top of the column. The two constituents could be mechanically separated with a knife.

Per 800 g. of starting material, 623 g. of solid, white suet with a water content of less than 0.2% by weight, m.p. 60° C., was obtained. The extraction residue, commonly known as "cracklings," was a reddish-brown mass containing, relative to total weight, 56.4% water and 22.8% crude protein, calculated as moist substance.

EXAMPLE 2

Example 1 was repeated, except that after extraction was terminated, the contents of the autoclave were not ejected, but the lower part of the autoclave was heated to 65° C. by means of the heating jacket, and the extracted fat was withdrawn in a molten state at the bottom of the autoclave.

The resultant end products exhibited a water content of less than 0.2% by weight, m.p. 60° C., saponification number 176, iodine number 40, and acid number 1.15.

It will be obvious to those skilled in the art that depending upon the apparatus used for extraction and the way the process is controlled, e.g., the location of the inlet for the gas used as solvent in the extraction operation, the extracted fat may be accumulated and withdrawn at the top or at the bottom of the column. In the two foregoing examples, the extracted fat accumulated at the bottom of the column inasmuch as the suet used as starting material for the extraction operation was placed in vessels $A_1$ and $A_2$ on the fine-pored metal filter plates indicated by dashed lines in the drawing, and the carbon dioxide used as solvent in the extraction operation was admitted at the top of the vessels. When vessels $A_1$ and $A_2$ are used without the metal filter plates, the extraction residue sinks to the bottom of the vessel because of its higher specific gravity, and the extracted fat lying above it can be withdrawn either at that location, i.e., from the upper part of the column, or in a molten state at the bottom of the column after having passed through the extraction residue.

What is claimed is:

1. A method of recovering and/or refining animal fats by extraction using a gas at supercritical conditions, wherein the improvement comprises the step of carrying out the extraction in a static column free from circulation within the column.

2. The method of claim 1, wherein said gas is carbon dioxide.

3. The method of claim 1, wherein said gas is nitrous oxide.

4. The method of claim 1, wherein said gas is a halogenated or unhalogenated hydrocarbon.

5. The method of claim 4, wherein said hydrocarbon is ethane, ethylene, or a fluorinated hydrocarbon.

6. The method of claim 1, wherein said extracted fat is accumulated in the lower part of said column.

7. The method of claim 1, wherein said extracted fat is separated mechanically.

8. The method of claim 1, wherein said extracted fat is separated by melting off.

9. The method of claim 1, wherein said animal fats are recovered from edible grades of offal.

* * * * *

UNITED STATES PATENT AND TRADEMARK OFFICE
CERTIFICATE OF CORRECTION

PATENT NO. : 4,280,961
DATED : July 28, 1981
INVENTOR(S) : Fred SCHNEIDER, Wolfgang SIRTL It is certified that error appears in the above—identified patent and that said Letters Patent is hereby corrected as shown below:

In column 2, line 39, the terminology should read:

$p > p_{crit.}$ and $t > t_{crit.}$

Signed and Sealed this

Fifteenth Day of December 1981

[SEAL]

*Attest:*

*Attesting Officer*

GERALD J. MOSSINGHOFF
*Commissioner of Patents and Trademarks*